(12) United States Patent
Kim

(10) Patent No.: US 12,447,955 B2
(45) Date of Patent: Oct. 21, 2025

(54) APPARATUS FOR CONTROLLING KEEPING LANE AND METHOD THEREOF

(71) Applicants: Kia Corporation, Seoul (KR); Hyundai Motor Company, Seoul (KR)

(72) Inventor: Seung Hyun Kim, Seoul (KR)

(73) Assignees: Hyundai Motor Company, South (KR); Kia Corporation, South (KR)

(*) Notice: Subject to any disclaimer, the term of this patent is extended or adjusted under 35 U.S.C. 154(b) by 166 days.

(21) Appl. No.: 18/179,885

(22) Filed: Mar. 7, 2023

(65) Prior Publication Data

US 2024/0025402 A1   Jan. 25, 2024

(30) Foreign Application Priority Data

Jul. 20, 2022 (KR) ........................ 10-2022-0089621

(51) Int. Cl.
  *B60W 30/12* (2020.01)
  *B60W 50/00* (2006.01)
  *B62D 15/02* (2006.01)

(52) U.S. Cl.
  CPC ............ *B60W 30/12* (2013.01); *B60W 50/00* (2013.01); *B62D 15/025* (2013.01); *B60W 2050/0012* (2013.01); *B60W 2050/0056* (2013.01); *B60W 2510/20* (2013.01); *B60W 2520/10* (2013.01); *B60W 2530/201* (2020.02); *B60W 2540/18* (2013.01)

(58) Field of Classification Search
  CPC ............... B60W 30/12; B60W 40/114; B60W 2510/20; B62D 6/003; B62D 15/025
  See application file for complete search history.

(56) References Cited

U.S. PATENT DOCUMENTS

| 2006/0041356 A1* | 2/2006 | Shirato ................... B62D 1/28 701/41 |
| 2020/0339152 A1* | 10/2020 | Inoue ................. B60W 60/0011 |
| 2021/0253166 A1* | 8/2021 | Tomoi ................. B62D 15/025 |

(Continued)

FOREIGN PATENT DOCUMENTS

| KR | 101846577 B1 | 4/2018 |
| KR | 20220124324 A | 9/2022 |
| KR | 20220146263 A | 11/2022 |

OTHER PUBLICATIONS

Kim, S., et al. "Lateral Control of a Commercial Vehicle Using Feedback Augmented Disturbance Observer," SAE International, SAE Technical Paper 2022-01-0093, 2022, doi: 10.4271/2022-01-0093., Mar. 29, 2022, 12 pages.

*Primary Examiner* — Wade Miles
*Assistant Examiner* — Jerrod Irvin Davis
(74) *Attorney, Agent, or Firm* — Slater Matsil, LLP

(57) ABSTRACT

In an embodiment a control apparatus includes a processor configured to calculate a target curvature depending on a target path of a vehicle, calculate a first lateral control value based on a feedforward control by using the target curvature, calculate a second lateral control value based on a feedback control by using vehicle information collected from a sensing device of the vehicle, estimate a disturbance by using the vehicle information collected from the sensing device of the vehicle, and calculate a final lateral control command value by summing the first lateral control value, the second lateral control value, and the disturbance and a storage configured to store data and algorithms driven by the processor.

19 Claims, 8 Drawing Sheets

(56) References Cited

U.S. PATENT DOCUMENTS

| | | | |
|---|---|---|---|
| 2022/0242481 A1* | 8/2022 | Mizoguchi | B62D 6/003 |
| 2022/0281524 A1 | 9/2022 | Kim | |
| 2022/0340200 A1 | 10/2022 | Kim | |

* cited by examiner

APPARATUS FOR CONTROLLING KEEPING LANE AND METHOD THEREOF

CROSS-REFERENCE TO RELATED APPLICATIONS

This application claims priority to and the benefit of Korean Patent Application No. 10-2022-0089621, filed in the Korean Intellectual Property Office on Jul. 20, 2022, the entire contents of which are incorporated herein by reference.

TECHNICAL FIELD

The present disclosure relates to a lane keeping control apparatus and a method thereof, and more particularly, to a lane keeping control technique capable of calculating a lateral control command value in consideration of time delay between a steering-wheel steering angle and a front-wheel steering angle.

BACKGROUND

A lane following assist (LFA) function indicates a technique that controls driving, braking or steering of a vehicle such that the vehicle can travel while maintaining a target path (e.g., a path along a center of a lane or a path following a vehicle in front).

In the case of a conventional lane keeping assistance, after receiving information related to the target path through a camera sensor provided in the vehicle, a front-wheel steering angle required to follow it is generated through control logic. Since most vehicles are not equipped with a front-wheel steering angle sensor, a calculated required front-wheel steering angle is converted into a required steering-wheel steering angle, and then a torque of a steering system is controlled by feedback based on a steering-wheel steering angle obtained through the steering-wheel steering angle sensor.

In the case of a conventional method, in a process of converting the required front-wheel steering angle into the required steering-wheel steering angle, the conversion is simply performed by using a gear ratio between the steering-wheel steering angle and the front-wheel steering angle of the vehicle.

However, in the case of a large vehicle such as a truck, a dynamic time delay may occur between the steering-wheel steering angle and the front-wheel steering angle by hydraulic pressure. In addition, due to a weight change of the vehicle, a dynamic model on which a control design is based often does not match an actual vehicle.

As such, conventionally, not only does it not reflect the time delay of the steering system of a commercial vehicle, but it also fails to overcome when there is an error (disturbing) in a model parameter of lateral dynamics, and thus it may cause oscillation and performance degradation of the vehicle, so it is necessary to develop a technique for ameliorating such problems.

The above information disclosed in this Background section is only for enhancement of understanding of the background of the disclosure, and therefore, it may contain information that does not form the prior art that is already known in this country to a person of ordinary skill in the art.

SUMMARY

Embodiments provide a lane keeping control apparatus and a method thereof, capable of greatly ameliorating an oscillation aspect of a lane following assist function and improving performance of a lane keeping function by ameliorating an error caused by a time delay for a steering system of a commercial vehicle and calculating a vehicle lateral control command value based on a dynamic model in which the error is ameliorated.

Further embodiments provide a lane keeping control apparatus including a processor configured to calculate a target curvature depending on a target path of a vehicle, to calculate a first lateral control value based on feedforward control by using the target curvature, to calculate a second lateral control value based on feedback control by using vehicle information collected from a sensing device of the vehicle, to estimate disturbance by using the vehicle information collected from the sensing device of the vehicle, and to calculate a final lateral control command value by summing the first lateral control value, the second lateral control value, and the disturbance; and a storage configured to store data and algorithms driven by the processor.

In an exemplary embodiment of the present disclosure, the processor may be configured to perform lateral control of the vehicle based on the final lateral control command value.

In an exemplary embodiment of the present disclosure, the processor may be configured to calculate the first lateral control value in consideration of a time delay of a steering system of the vehicle.

In an exemplary embodiment of the present disclosure, the processor may be configured to calculate the first lateral control value in consideration of the time delay through a time delay model.

In an exemplary embodiment of the present disclosure, the processor may be configured to calculate the first lateral control value by compensating for the time delay through a differential controller in a Laplace transform process.

In an exemplary embodiment of the present disclosure, the processor may be configured to design the time delay model by using at least one of a wheel base of the vehicle, a vehicle speed, a time constant, a gear ratio of a front-wheel steering angle to a steering-wheel steering angle, the steering-wheel steering angle, or any combination thereof.

In an exemplary embodiment of the present disclosure, the processor, after controlling the vehicle with the final lateral control command value, may be configured to input vehicle information collected from the sensing device of the vehicle into an inverse function that inverses a time delay model, and to obtain disturbance by subtracting an output value of the inverse function and the final lateral control command value therefrom.

In an exemplary embodiment of the present disclosure, the processor may be configured to filter the disturbance through a low-pass filter.

In an exemplary embodiment of the present disclosure, the processor may be configured to sum the filtered disturbance with the first lateral control value and the second lateral control value to output it as the final lateral control command value.

In an exemplary embodiment of the present disclosure, the processor after controlling the vehicle with the final lateral control command value, may be configured to calculate a rotational curvature of the vehicle using vehicle information collected from the sensing device of the vehicle, and to subtract the rotational curvature of the vehicle from the target curvature.

In an exemplary embodiment of the present disclosure, the processor may be configured to multiply a value obtained by subtracting the rotational curvature of the vehicle from the target curvature by a feedback gain.

In an exemplary embodiment of the present disclosure, the processor may be configured to calculate the second lateral control value by multiplying a value obtained by subtracting the rotational curvature of the vehicle from the target curvature by a reciprocal of a gear ratio of a front-wheel steering angle to a steering-wheel steering angle.

An exemplary embodiment of the present disclosure provides a lane keeping control method including: calculating, by a processor, a target curvature depending on a target path of a vehicle, and calculating a first lateral control value based on feedforward control by using the target curvature; calculating, by the processor, a second lateral control value based on feedback control by using vehicle information collected from a sensing device of the vehicle; estimating, by the processor, disturbance by using the vehicle information collected from the sensing device of the vehicle; and calculating, by the processor, a final lateral control command value by summing the first lateral control value, the second lateral control value, and the disturbance.

In an exemplary embodiment of the present disclosure, it may further include performing, by the processor, lateral control of the vehicle based on the final lateral control command value.

In an exemplary embodiment of the present disclosure, the calculating of the first lateral control value includes calculating, by the processor, the first lateral control value in consideration of a time delay of a steering system of the vehicle.

In an exemplary embodiment of the present disclosure, the calculating of the first lateral control value may include: calculating, by the processor, the first lateral control value in consideration of the time delay through a time delay model; and designing, by the processor, the time delay model by using at least one of a wheel base of the vehicle, a vehicle speed, a time constant, a gear ratio of a front-wheel steering angle to a steering-wheel steering angle, the steering-wheel steering angle, or any combination thereof.

In an exemplary embodiment of the present disclosure, the estimating of the disturbance may include: after controlling the vehicle with the final lateral control command value, inputting, by the processor, vehicle information collected from the sensing device of the vehicle into an inverse function that inverses a time delay model; and obtaining, by the processor, disturbance by subtracting an output value of the inverse function and the final lateral control command value therefrom.

In an exemplary embodiment of the present disclosure, the estimating of the disturbance may further include filtering the disturbance through a low-pass filter.

In an exemplary embodiment of the present disclosure, the calculating of the second lateral control value may include: after controlling the vehicle with the final lateral control command value, calculating, by the processor, a rotational curvature of the vehicle by using vehicle information collected from the sensing device of the vehicle; and subtracting, by the processor, the rotational curvature of the vehicle from the target curvature.

In an exemplary embodiment of the present disclosure, the calculating of the second lateral control value may include: multiplying, by the processor, a value obtained by subtracting the rotational curvature of the vehicle from the target curvature by a feedback; and calculating, by the processor, the second lateral control value by multiplying a value multiplied by the feedback gain by a reciprocal of a gear ratio of a front-wheel steering angle to a steering-wheel steering angle.

According to embodiment techniques, it is possible to greatly ameliorate an oscillation aspect of a lane following assist function and improve performance of a lane keeping function by ameliorating an error caused by a time delay for a steering system of a commercial vehicle and calculating a vehicle lateral control command value based on a dynamic model in which the error is ameliorated.

Furthermore, various effects that can be directly or indirectly identified through this document may be provided.

DETAILED DESCRIPTION OF ILLUSTRATIVE EMBODIMENTS

Figure 1:
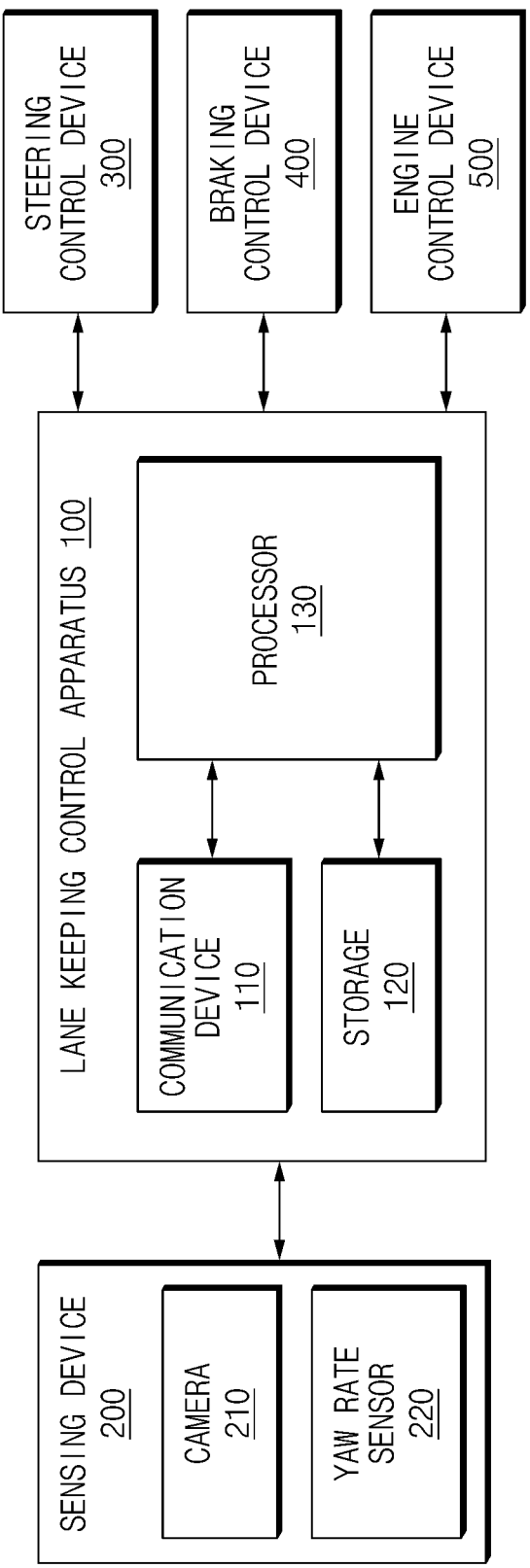
FIG. 1 illustrates a block diagram showing a configuration of a vehicle system including a lane keeping control apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 7.

Figure 2:
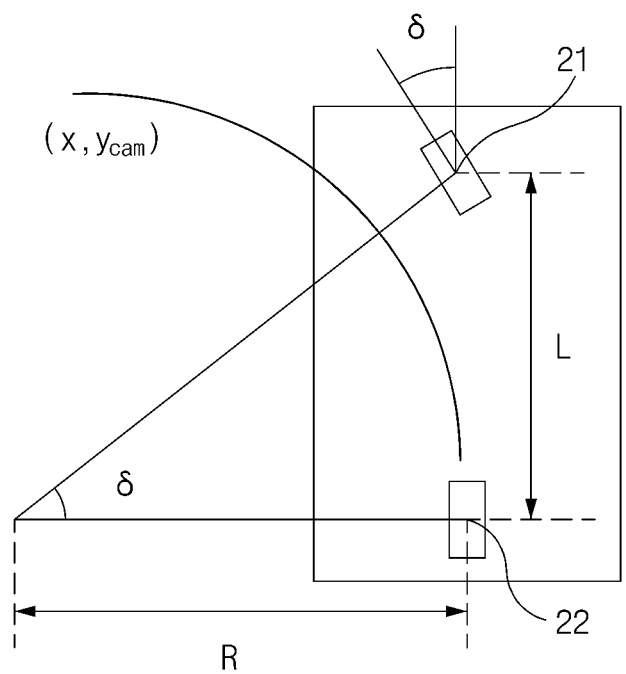
FIG. 2 illustrates a view for describing a design process of a vehicle lateral control dynamics model reflecting a dynamic time delay of a lane keeping control system according to an exemplary embodiment of the present disclosure.

FIG. 1 illustrates a block diagram showing a configuration of a vehicle system including a lane keeping control apparatus according to an exemplary embodiment of the present disclosure, and FIG. 2 illustrates a view for describing a design process of a vehicle lateral control dynamics model reflecting a dynamic time delay of a lane keeping control system according to an exemplary embodiment of the present disclosure.

The lane keeping control apparatus 100 according to the present disclosure may be implemented inside or outside the vehicle. In this case, the lane keeping control apparatus may be integrally formed with internal control units of the vehicle, or may be implemented as a separate hardware device to be connected to control units of the vehicle by a connection means. For example, the lane keeping control apparatus 100 may be implemented integrally with the vehicle, may be implemented in a form that is installed or attached to the vehicle as a configuration separate from the vehicle, or a part thereof may be implemented integrally with the vehicle, and another part may be implemented in a form that is installed or attached to the vehicle as a configuration separate from the vehicle.

For example, the lane keeping control apparatus 100 may be implemented as a lane following assist (LFA), a lane departure warning (LDW), a lane keeping system (LKS), and a lane keeping assistance device system (LKAS), etc.

The lane keeping control apparatus 100 may establish a dynamics model in consideration of a time delay of a steering-wheel steering angle and a front-wheel steering angle, and estimate disturbance based on the dynamics model, to use a first lateral control value based on feedforward control and collected vehicle information so as to calculate a second lateral control value based on feedback control and a final lateral control command value including the disturbance. Herein, the disturbance may include a steering angle sensor offset such as a time delay parameter and a gear ratio, and various modeling disturbances.

Referring to FIG. 1, the vehicle system according to the exemplary embodiment of the present disclosure may include a lane keeping control apparatus 100, a sensing device 200, a steering control device 300, a braking control device 400, and an engine control device 500.

The lane keeping control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 110 may communicate with in-vehicle devices, and may receive a sensing result from the sensing device 200. Particularly, the communication device 110 may receive a distance error from a camera 210 to a center of a vehicle on a gazing distance.

The storage 120 may store sensing results of the sensing device 200 and data and/or algorithms required for the processor 130 to operate, and the like. For example, the storage 120 may store a target rotational radius calculated by the processor 130, a required front-wheel steering angle, a dynamic model, a formula for calculating the lateral control command value, a first lateral control value, a second lateral control value, estimated disturbance, etc.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, etc., may electrically control each component, and may process a signal transferred between each constituent element. In addition, the processor 130 may be an electrical circuit that executes a command of software, thereby performing various data processing and calculations to be described later.

The processor 130 may be implemented as a microprocessor, but the present disclosure is not limited thereto, and may be, e.g., an electronic control unit (ECU), a micro controller unit (MCU), or other subcontrollers mounted in the vehicle.

The processor 130 may calculate a target curvature depending on a target path of the vehicle, may calculate a first lateral control value based on feedforward control by using the target curvature, may calculate a second lateral control value based on feedback control by using vehicle information collected from a sensing device of the vehicle, may calculate a second lateral control value based on feedback control using vehicle information collected from a vehicle sensing device to estimate disturbance using the vehicle information collected from the sensing device of the vehicle, and may perform lateral control of the vehicle based on the final lateral control command value.

The processor 130 may calculate the first lateral control value in consideration of a time delay of a steering system of the vehicle. That is, the processor 130 may calculate the first lateral control value in consideration of a time delay through a time delay model (Equation 6). In addition, the processor 130 may calculate the first lateral control value by compensating for the time delay through a differential controller in a Laplace transform process.

The processor 130 may design a time delay model by using at least one of a wheel base of the vehicle, a vehicle speed, a time constant, a gear ratio of the front-wheel steering angle to the steering-wheel steering angle, the steering-wheel steering angle, or any combination thereof.

The processor 130 may control the vehicle with the final lateral control command value, and then input vehicle information collected from the sensing device of the vehicle into an inverse function that inverses the time delay model, may obtain disturbance by subtracting an output value of the inverse function and the final lateral control command value therefrom, and may filter the disturbance through a low-pass filter.

The processor 130 may combine the filtered disturbance with the first lateral control value and the second lateral control value to output it as the final lateral control command value.

The processor 130 may control the vehicle with the final lateral control command value, and then may calculate a rotational curvature of the vehicle using vehicle information collected from a sensing device of the vehicle, and may subtract the rotational curvature of the vehicle from a target curvature.

In addition, the processor 130 may multiply a value obtained by subtracting the rotational curvature of the vehicle from the target curvature by a feedback gain K.

In addition, the processor 130 may calculate the second lateral control value by multiplying the value obtained by subtracting the rotational curvature of the vehicle from the target curvature by a reciprocal of the gear ratio of the front-wheel steering angle to the steering-wheel steering angle.

Hereinafter, a method of calculating the final lateral control value will be described in detail.

The processor 130 may calculate the target path and the front-wheel steering angle required depending on the target path, based on obtained surrounding information.

As an example, the processor 130 may detect information related to lanes around the vehicle or information related to a vehicle in front through acquired images around the vehicle in a state where the lane following assist (LFA) function is activated.

For example, the processor 130 may set a path in a center of opposite lanes to a lane in which the vehicle is traveling or a path following a front vehicle as the target path.

For example, when the opposite lanes to the lane in which the vehicle is traveling are detected, the processor 130 may set the path in the center of the opposite lanes as the target path, and when the opposite lanes to the lane in which the vehicle is traveling are not detected, may set the path following a front vehicle as the target path.

For example, the processor 130 may calculate the target rotational radius for maintaining the target path, and may calculate a required front-wheel steering angle in response to the target rotational radius.

The processor 130 may obtain the target rotational radius as shown in Equation 1 through a lane central distance error $y_{error}$ on a gazing distance x received from the camera 210.

$$R = \left(\frac{2y_{error}}{x^2 + y^2 \text{ error}}\right) \quad \text{(Equation 1)}$$

Herein, $R_d$ indicates the target rotational radius, $y_{error}$ indicates the lane central distance error, and x indicates the gazing distance. FIG. 2 illustrates a view for describing a process of calculating a target rotational radius based on a geometry map of a lane keeping control apparatus according to an exemplary embodiment of the present disclosure. As illustrated in FIG. 2, the target rotational radius represents a rotational radius for the vehicle to reach the center of the lane.

For example, the processor 130 may calculate the target rotational radius for maintaining the target path based on a lane error detected through an image acquired by the sensing device 200.

For example, when the vehicle deviates from the target path by exceeding a threshold or a heading direction of the vehicle is different from a direction of the target path, the processor 130 may calculate the target rotational radius depending on steering control for maintaining the target path. Herein, the processor 130 may calculate the target rotational radius in consideration of a driving speed of the vehicle.

As an example, the processor 130 may calculate the required front-wheel steering angle through Equations 2 to 4 below, based on the target rotational radius.

First, the processor 130 may calculate tan(δ) from a bicycle geometry model as shown in Equation 2 below.

$$\tan(\delta) \approx \delta = \frac{L}{R} \quad \text{(Equation 2)}$$

Herein, δ indicates the required front-wheel steering angle, R indicates a target rotational radius of a front wheel, and L indicates a distance between a front wheel 21 and a rear wheel 22 of the vehicle as illustrated in FIG. 2 as a wheel base between front and rear wheels of the vehicle.

The processor 130 may calculate the required front-wheel steering angle δ in consideration of understeer gradients.

$$\delta = \frac{1}{R}(L + U_{us}V^2) = \frac{1}{R}\tilde{L} \quad \text{(Equation 3)}$$

Herein, $K_{us}$ indicates an understeer gradient and V indicates a vehicle speed.

The processor 130 determines may calculate the required front-wheel steering angle δ by dividing $\tilde{L}$, which is a value obtained by summing a square of the vehicle wheelbase L, the understeer gradient $K_{us}$ and the vehicle speed V, by the target rotational radius R.

The processor 130 may calculate the required front-wheel steering angle δ in consideration of the time delay in consideration of the time delay as shown in Equation 4.

$$\delta = \frac{GR}{1 + \tau \cdot s}\theta \quad \text{(Equation 4)}$$

Herein, τ indicates a gain depending on the time delay as a time constant, and may be determined as a time delay value through time delay modeling. In addition, θ denotes the steering-wheel steering angle, GR denotes the gear ratio of the front-wheel steering angle to the steering-wheel steering angle, and s denotes a complex number in a Laplace transform.

The processor 130 may calculate a rotational curvature of the vehicle as shown in Equation 5 below. In this case, the rotational curvature of the vehicle indicates a curvature of the vehicle rotated by a steering wheel steering angle command.

$$\rho = \frac{1}{R} = \frac{\dot{\psi}}{V} \quad \text{(Equation 5)}$$

Herein, $\dot{\psi}$ indicates a yaw rate of the vehicle, and V is the vehicle speed.

That is, the rotational curvature ρ of the vehicle indicates a value obtained by dividing the yaw rate of the vehicle by the vehicle speed.

A dynamics model in consideration of a dynamic time delay as shown in Equation 6 below may be defined by substituting Equation 4 and Equation 5 into Equation 3.

$$\rho = \frac{1}{R} = \frac{\dot{\psi}}{\tilde{L}} \cdot \frac{k}{1 + \tau \cdot s}\theta \quad \text{(Equation 6)}$$

A relationship between the front-wheel steering angle and the steering angle at which the dynamic delay occurs may be expressed by using a time constant of a first-order transfer function. In this case, k indicates the gear ratio GR.

Hereinafter, a process of calculating a lateral control command value for lane keeping control of a commercial vehicle using a disturbance observer will be described with reference to FIG. 3A and FIG. 3B.

Figure 3A:
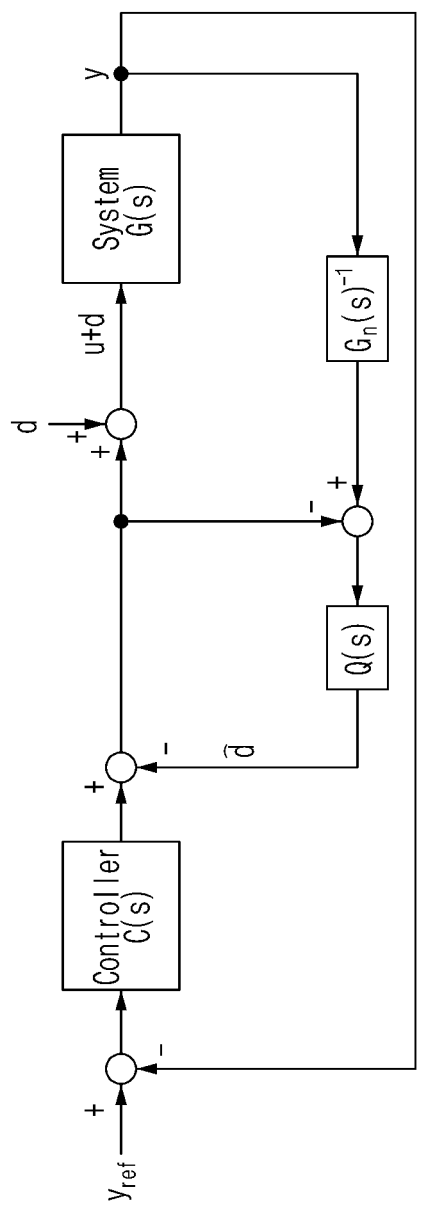
FIG. 3A illustrates a configuration and operation of a disturbance observer according to an exemplary embodiment of the present disclosure.
Figure 3B:
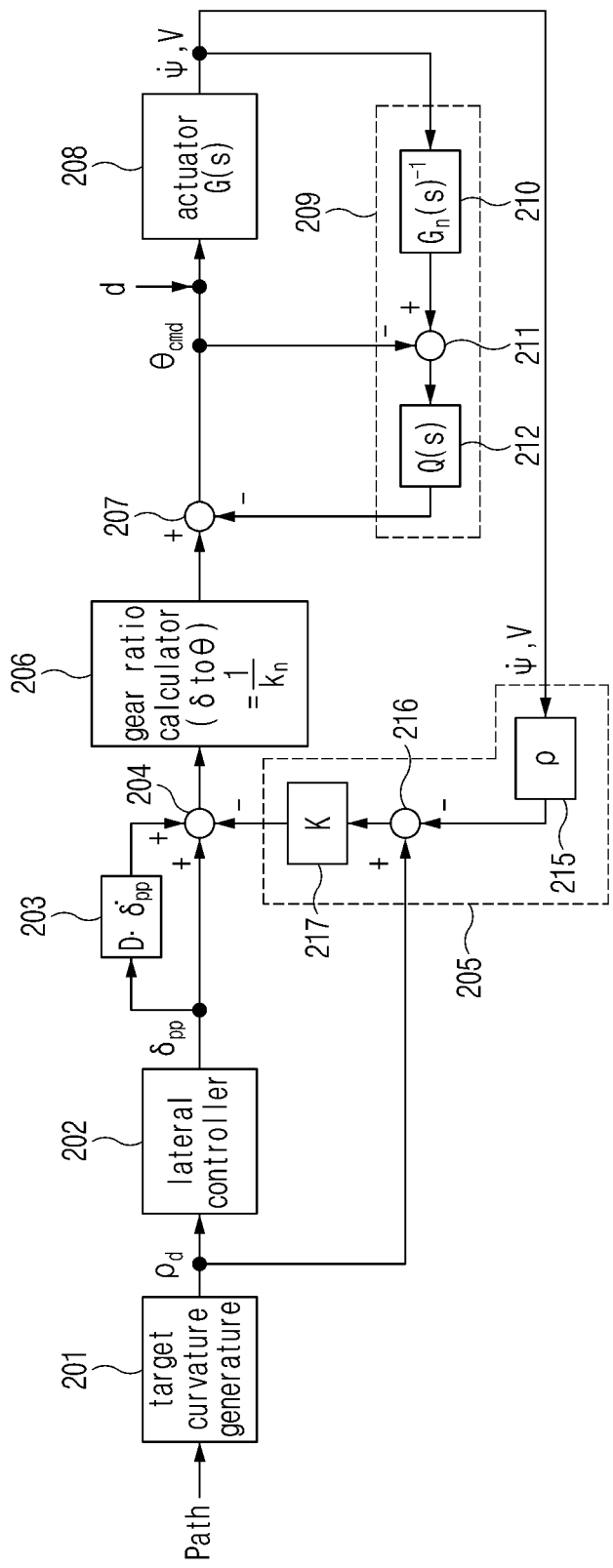
FIG. 3B illustrates a specific configuration and operation of a lane following assistance system according to an exemplary embodiment of the present disclosure.

FIG. 3A illustrates a configuration and operation of a disturbance observer according to an exemplary embodiment of the present disclosure, and FIG. 3B illustrates a specific configuration and operation of a lane following assistance system according to an exemplary embodiment of the present disclosure.

A system illustrated in FIG. 3A is a basic disturbance observer, and a controller C(s) outputs a control signal by calculating an input signal $y_{ref}$ and an output signal y outputted from a system G(s). The system G(s) is a lateral control dynamics modeling stem with parametric uncertainty, and Gn(s) is a nominal parametric model.

Assuming that there is an input signal u, u+d is inputted to the system G(s) by adding a disturbance d to the input signal u. In this case, the system G(s) may be an actuator.

Accordingly, the system G(s) outputs the output signal y, and the output signal y is inputted to an inverse function $Gn(s)^{-1}$ of the system Gn(s). In this case, the inverse function $Gn(s)^{-1}$ is for verifying whether an input signal of the system G(s) is the same as an output signal of the inverse function $Gn(s)^{-1}$ by using the output signal y of the system G(s) as an input signal.

That is, when the output signal received from the sensing device 200 during vehicle driving is y, the inverse function $Gn(s)^{-1}$ is an estimated value u+d̂, and the disturbance may be estimated by subtracting the input signal u from the estimated value u+d̂, d̂, which is an estimate of the disturbance, is transferred to the filter Q(s), the filter Q(s) filters and outputs d̂, and a value obtained by subtracting the filtered d from the output of the controller C(s) is output as a u value. In this case, the filter Q(s) may be implemented as a low-pass filter.

Referring to FIG. 3B, the system according to an exemplary embodiment of the present disclosure may include a target curvature generator 201, a lateral controller 202, a differential controller 203, an arithmetic device 204, a feedback controller 205, a gear ratio calculator 206, an arithmetic device 207, an actuator 208, and a disturbance observer 209.

The target path is inputted to the target curvature generator 201, and the target curvature generator 201 outputs a target curvature $\rho_d$. In this case, the target curvature generator 201 may calculate the target curvature based on Equation 6.

The lateral controller 202 may calculate the front-wheel steering angle δ pp by using the target curvature as an input. In this case, the lateral controller 202 may calculate the required front-wheel steering angle δ pp based on pure pursuit geometry.

The differential controller 203 may differentiate the required front-wheel steering angle δ pp, and the feedback controller 205 may output a feedback value using a value outputted from the actuator 208. In this case, the value outputted from the actuator 208 may be replaced with a value obtained from the sensing device 200 in the vehicle while the vehicle is driving.

The arithmetic device 204 may sum the output value of the differential controller 203 and the output value of the feedback controller 205, and the gear ratio calculator 206 may multiply the value added by the calculator 204 by a reciprocal $$\frac{1}{k_n}$$

of the gear ratio. The 3arithmetic device 207 may output the final lateral control output value (θcmd, steering wheel steering angle command value) by subtracting an output value of the disturbance observer 209 from a product of a sum of the reciprocal $$\frac{1}{k_n}$$

of the gear ratio and the output value of the differential controller 203 and the output value of the feedback controller 205.

The processor 130 may develop it as shown in Equations 7 and 8 below by using a dynamics model reflecting a dynamic delay time of Equation 6.

Hereinafter in Equation 7 or below, a required current steering angle θ will be described by substituting it with θcmd.

$$\rho = \frac{1}{L} \cdot \frac{k}{1 + \tau \cdot s} \theta_{cmd} \quad \text{(Equation 7)}$$

Equation 8 is an expression of Equation 7 as a transfer function G(s).

$$G(s) \frac{1}{L} \cdot \frac{k}{1 + \tau \cdot s} \quad \text{(Equation 8)}$$

In this case, Tτ, k, and L are uncertain parameters.

$$G_n(s) \frac{1}{L} \cdot \frac{k_n}{1 + \tau_n \cdot s} \quad \text{(Equation 9)}$$

Equation 7 may be inversed and expressed as Equation 10 below. In this case, Gn(s) is a known nominal model function having a same structure as that of the transfer function G(s). Equation 10 indicates $G_n(s)^{-1}$.

τn, kn, and Ln are nominal values and may be set to optimal values by experimental values in advance to facilitate controller design.

$$\frac{L}{k}\rho + \frac{L}{k}\tau \cdot \rho s = \theta_{cmd} \quad \text{(Equation 10)}$$

Equation 10 may be derived as an equation including a known nominal value and an unknown uncertain disturbance d as shown in Equation 11 below.

$$\left(\frac{L_n}{k_n}\rho + \frac{L_n}{k_n}\tau_n\rho s\right) + \left[\left(\frac{L}{k}\rho + \frac{L}{k}\tau\rho s\right) - \left(\frac{L_n}{k_n}\rho + \frac{L_n}{k_n}\tau_n\rho s\right)\right] = \quad \text{(Equation 11)}$$

$$\theta_{cmd}\left(\frac{\overline{L}_n}{k_n}\rho + \frac{\overline{L}_n}{k_n}\tau_n\rho s\right)$$

is a known nominal value, and $$\left[\left(\frac{\overline{L}}{k}\rho + \frac{\overline{L}}{k}\tau\rho s\right) - \left(\frac{\overline{L}_n}{k_n}\rho + \frac{\overline{L}_n}{k_n}\tau_n\rho s\right)\right]$$

becomes the disturbance d, which is an uncertain value whose value is unknown. Equation 11 may be simplified as Equation 12.

$$\left(\frac{\overline{L}_n}{k_n}\rho + \frac{\overline{L}_n}{k_n}\tau_n\rho s\right) - d = \theta_{cmd} \quad \text{(Equatio 12)}$$

From Equation 12, the disturbance d may be summarized as Equation 13 below.

$$-d \approx \theta_{DOB} = Q(s) \cdot \left[\theta_{cmd} - \left(\frac{\overline{L}_n}{k_n}\rho + \frac{\overline{L}_n}{k_n}\tau_n\rho s\right)\right] \quad \text{(Equation 13)}$$

A known nominal model and the disturbance d may be divided through Equations 11 to 13 described above. Hereinafter, the disturbance d is estimated and excluded.

Equation 14 defines Q(s), and Q(s) may be implemented as a first-order low-pass filter.

$$Q(s) = \frac{1}{1 + \tau_q s} \quad \text{(Equation 14)}$$

As shown in equation 15, the steering angle control command (lateral control command) θcmd may be designed such that an actual curvature of the vehicle becomes a required curvature in the presence of disturbance. That is, the steering angle control command θcmd may be divided into an estimated disturbance value and an external controller value.

$$\left(\frac{\overline{L}_n}{k_n}\rho + \frac{\overline{L}_n}{k_n}\tau_n\rho s\right) - d = \theta_{cmd} = \theta_{0,cmd} + \theta_{DOB} \quad \text{(Equation 15)}$$

In addition, as in Equations 16 and 17, a lateral control command value $\theta_{0,cmd}$ is a control input of the known nominal model. The controller may be freely designed by separating the disturbance $\theta_{DOB}$.

$$\left(\frac{\overline{L}_n}{k_n}\rho + \frac{\overline{L}_n}{k_n}\tau_n\rho s\right) = \theta_{0,cmd} \quad \text{(Equation 16)}$$

Herein, kn, $\overline{L}_n$, and τn indicate average values of values thereof.

$$\theta_{0,cmd} = \left(\frac{\overline{L}_n}{k_n}\rho_d + \frac{\overline{L}_n}{k_n}\tau_n \cdot \rho_d s\right) + K \cdot \frac{1}{k_n}(\rho_d - \rho) \quad \text{(Equation 17)}$$

Herein, K indicates the feedback gain.

Equation 18 is an equation for confirming controller suitability (lateral error convergence).

$$(\overline{L}_n + K)\rho_e + (\overline{L}_n \cdot \tau_n)\dot{\rho}_e = 0 \quad \text{(Equation 18)}$$

Herein, the curvature error is a value obtained by subtracting a current curvature from a required curvature. That is, it is $\rho_e = \rho_d - \rho$ It indicates that the error dynamics model is stable when K is designed such that (Ln+K)>o. As a result, the proposed controller may achieve a design goal (ρe=o).

Equation 19 is an equation defining the final steering control command θcmd.

$$\theta_{cmd} = \theta_{0,cmd} + \theta_{DOB} = \quad \text{(Equation 19)}$$

$$\left(\frac{\overline{L}_n}{k_n}\rho_d + \frac{\overline{L}_n}{k_n}\tau_n \cdot \rho_d s\right) + K \cdot \frac{1}{k_n}(\rho_d - \rho) + \theta_{DOB} = \theta_{FF} + \theta_{FB} + \theta_{DOB}$$

$\theta_{FF}$ indicates the feedforward control value, $\theta_{FB}$ indicates the feedback control value, $\theta_{DOB}$ indicates the disturbance observer.

$\theta_{FF}$ serves as an upfront compensation for a dynamic delay of the actuator.

$\theta_{FB}$ is designed to feed back the current rotational radius of the vehicle. This feedback term may compensate for curvature errors in transient phases when the vehicle does not behave depending on a predicted motion model. $\theta_{FB}$ is designed to compensate for disturbances and modeling errors.

When Equation 19 is expanded, Equation 20 is shown below.

$$\theta_{cmd} = \quad \text{(Equation 20)}$$

$$\left(\frac{\overline{L}_n}{k_n}\rho_d + \frac{\overline{L}_n}{k_n}\tau_n \cdot \rho_d s\right) + \left[K \cdot \frac{1}{k_n}(\rho_d - \rho)\right] + Q(s)\left[\theta_{cmd} - \frac{\overline{L}_n}{k_n}\rho + \frac{\overline{L}_n}{k_n}\tau_n \cdot \rho s\right]$$

In FIG. 3B, the disturbance observer 209 inputs an output value (output value outputted through Equation 20) outputted from the sensing device 200 to Gn(s)⁻¹, and subtracts the output value of Gn(s)⁻¹ and the input value inputted to G(s), and then filters a subtracted value through Q(s). In this case, the output value of G(s) becomes the input value of Gn(s)⁻¹, and the output value of Gn(s)⁻¹ must be the same as the input value of G(s).

Accordingly, a value obtained by subtracting the input value of G(s) from the output value of Gn(s)⁻¹ becomes a disturbance d.

The disturbance d is filtered in Q(s), and the filtered disturbance becomes $\theta_{DOB}$.

In addition, a rotational curvature calculator 215 calculates a rotational curvature ρ of the vehicle using the output value output from the sensing device 200, and the calculator 216 subtracts the rotational curvature ρ of the vehicle from a target curvature $\rho_d$ calculated by a target curvature generator 201.

A gain device 217 multiplies a value obtained by subtracting the rotational curvature ρ of the vehicle from the target curvature $\rho_d$ by the feedback gain K.

Accordingly, the system may produce the lateral control command θcmd by summing a value $$\left(\frac{\bar{L}_n}{k_n}\rho_d + \frac{\bar{L}_n}{k_n}\tau_n \cdot \rho_d s\right) + \left[K \cdot \frac{1}{k_n}(\rho_d - \rho)\right]$$

obtained by multiplying the sum of the output value of the differential controller 203 and the output value of the feedback controller 205 by a reciprocal of the gear ratio (1/kn) and $$Q(s)\left[\theta_{cmd} - \frac{\bar{L}_n}{k_n}\rho + \frac{\bar{L}_n}{k_n}\tau_n \cdot \rho s\right]$$

outputted from the disturbance observer 209. Then, the optimal lateral control command θcmd may be derived by applying it to the feedback controller 205 and the disturbance observer 209 based on vehicle movement information (yaw rate, vehicle speed) depending on the lateral control command θcmd.

The sensing device 200 may be provided in the vehicle to obtain surrounding information of the vehicle. As an example, the sensing device 200 may include a camera 210 that acquires surrounding lane information of the vehicle or an image of a vehicle in front, a yaw rate sensor 220 that detects a yaw rate of the vehicle, and the like.

For example, the sensing device 200 may be connected to the processor 130 through wireless or wired communication, and may directly or indirectly transmit the surrounding lane information of the vehicle or image information related to the front vehicle to the processor 130.

The steering control device 300 may be configured to control a steering angle of a vehicle, and may include a steering wheel, an actuator interlocked with the steering wheel, and a controller controlling the actuator.

The braking control device 400 may be configured to control braking of the vehicle, and may include a controller that controls a brake thereof.

An engine control device 500 may be configured to control engine driving of a vehicle, and may include a controller that controls a speed of the vehicle.

Figure 4:
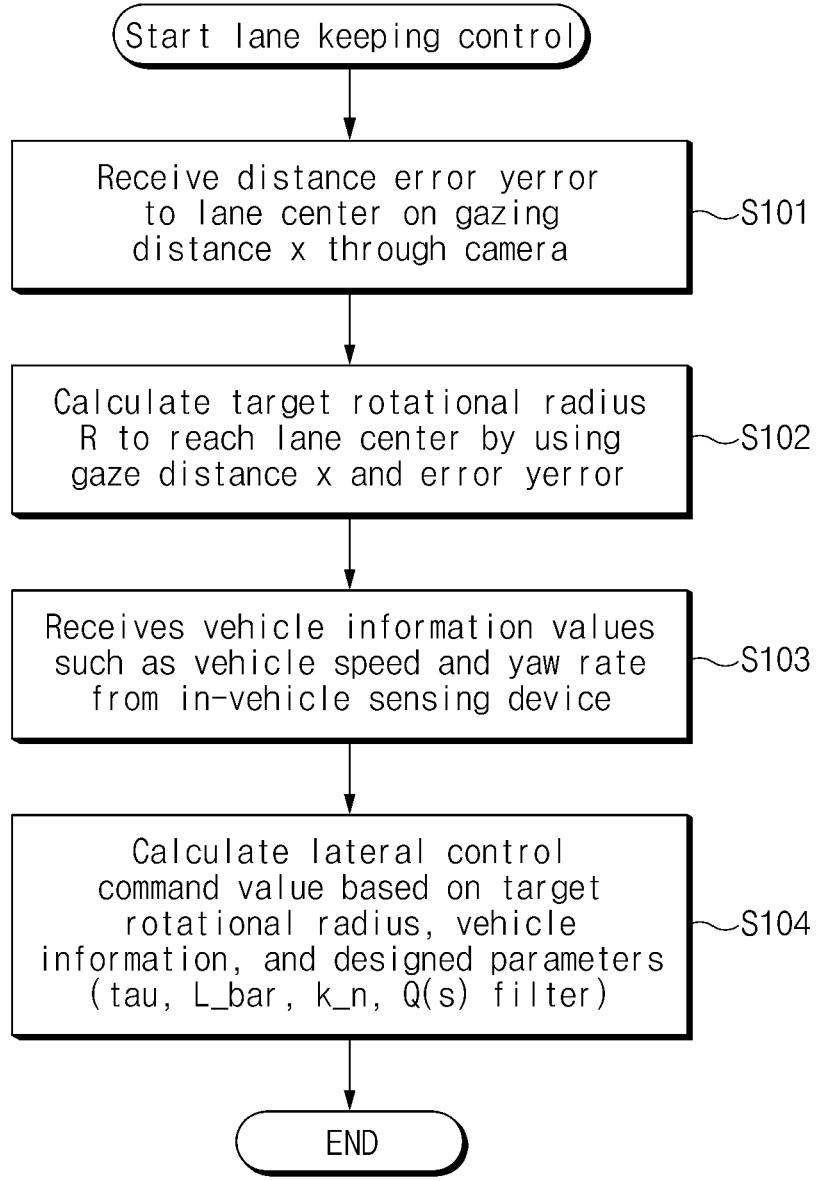
FIG. 4 illustrates a flowchart for describing a method of calculating a lateral control command value in consideration of a dynamic time delay and an error in a dynamics model according to an exemplary embodiment of the present disclosure.

Hereinafter, a lane keeping control method according to an exemplary embodiment of the present disclosure will be described in detail with reference to FIG. 4. FIG. 4 illustrates a flowchart for describing a lane keeping control method based on yawrate feedback according to an exemplary embodiment of the present disclosure.

Hereinafter, it is assumed that the lane keeping control apparatus 100 of the of FIG. 1 performs processes of FIG. 4. In addition, in the description of FIG. 4, operations described as being performed by a device may be understood as being controlled by the processor 130 of the lane keeping control apparatus 100.

Referring to FIG. 4, the lane keeping control apparatus 100 receives the lane central distance error $y_{cam}$ to a center of a lane on a gazing distance x from the camera 210 (S101), and calculates a target rotational radius R for the vehicle to reach the center of the lane by using the lane central distance error $y_{cam}$ from the gaze distance x (S102).

It receives vehicle information values such as a vehicle speed and a yaw rate from the in-vehicle sensing device 200 (S103).

Accordingly, the lane keeping control apparatus 100 calculates the lateral control command value θcmd based on Equation 20 based on a target rotational radius, vehicle information, and designed parameters (S104).

As such, according to the present disclosure, disturbance may be eliminated by designing a new kinetic model that can take a time delay into account, assuming that disturbances (e.g., time delay parameters, etc.) may also exist in kinetic model parameters, and designing the disturbance observer 209 based on a dynamics model considering the time delay, and the differential controller 203 and the rotational radius feedback controller 205 may be designed based on a known nominal model with the disturbance removed.

That is, according to the present disclosure, a more accurate lateral control command value may be generated by calculating the lateral control command value through the dynamics model reflecting the dynamic time delay, the disturbance observer reflecting the dynamics model, the differential controller, and the feedback controller, thereby performing stable lane keeping control.

Figure 5:
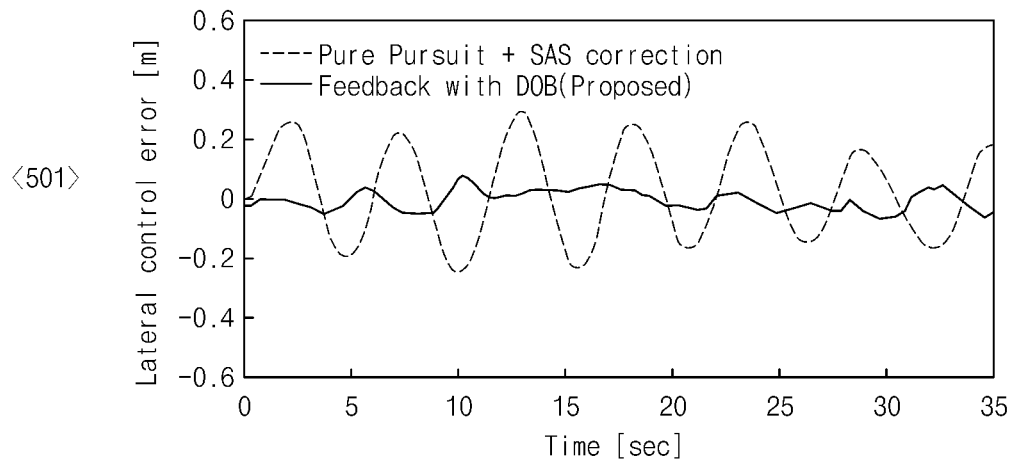
FIG. 5 illustrates a lane keeping control effect on a straight road according to an exemplary embodiment of the present disclosure.
Figure 6:
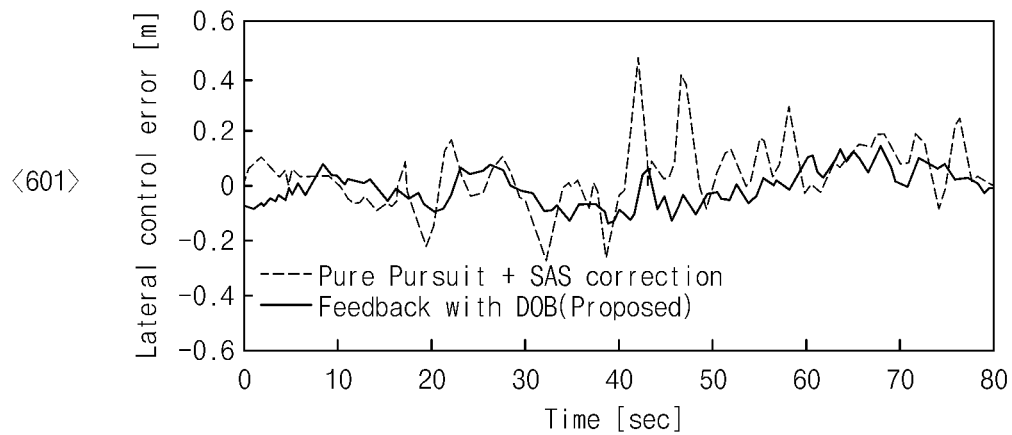
FIG. 6 illustrates a lane keeping control effect on a complex road according to an exemplary embodiment of the present disclosure.

FIG. 5 illustrates a lane keeping control effect on a straight road according to an exemplary embodiment of the present disclosure, and FIG. 6 illustrates a lane keeping control effect on a complex road (including a straight road and s curved road) according to an exemplary embodiment of the present disclosure.

Referring to a view 501 of FIG. 5, it can be seen that oscillation severely occurs during lateral control by using an existing pur pursuit method on a straight road, but there is almost no oscillation during lateral control by using the feedback method of the present disclosure. Referring to a view 502, it can be seen that an average value of the lateral control error is significantly reduced, and a maximum value of the lateral control error is reduced.

Referring to a view 601 of FIG. 6, it can be seen that there is a large deviation in a lateral control error during lateral control by using the existing pur pursuit method on a complex road, but the deviation in the lateral control error is small during lateral control by using the feedback method of the present disclosure. Referring to a view 602, it can be seen that an average value of the lateral control error is significantly reduced, and a maximum value of the lateral control error is reduced.

Figure 7:
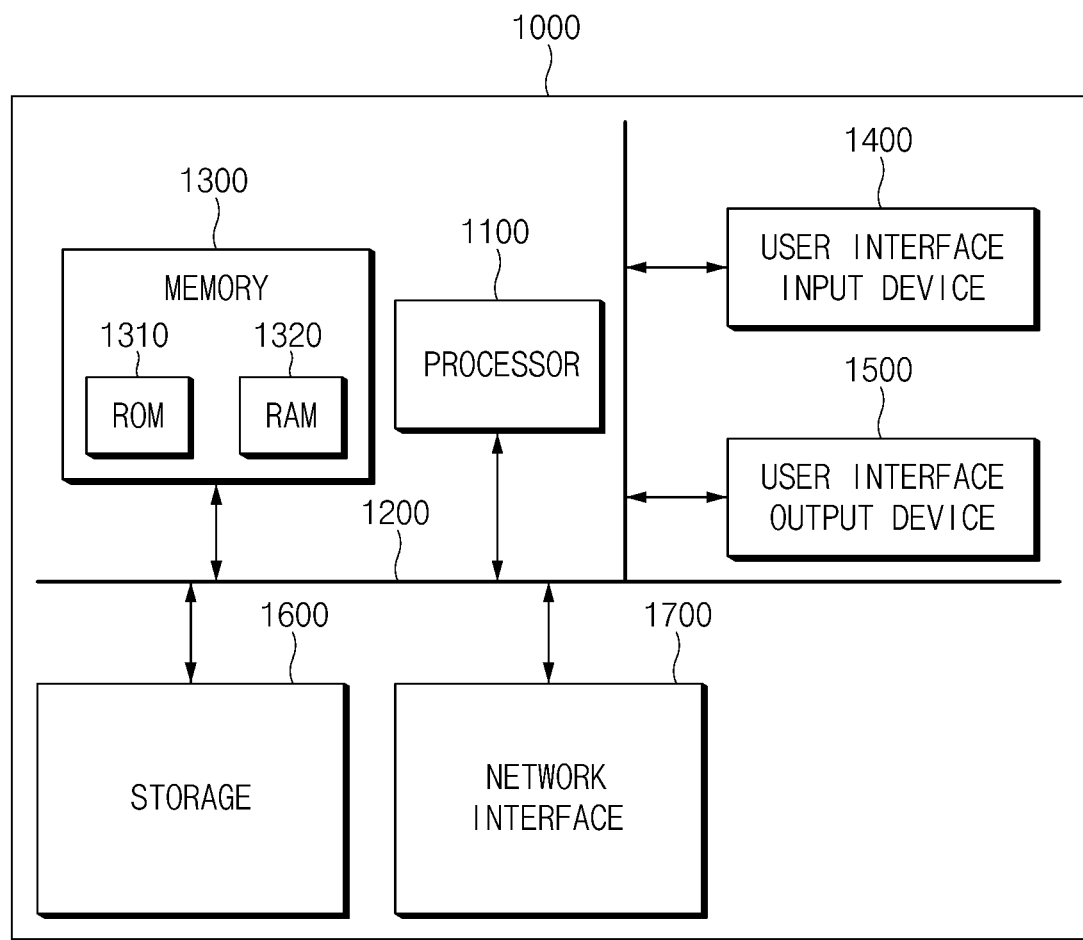
FIG. 7 illustrates a computing system according to an exemplary embodiment of the present disclosure.

FIG. 7 illustrates a computing system according to an exemplary embodiment of the present disclosure.

Referring to FIG. 7, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments.

The protection range of the present disclosure should be interpreted by the claims below, and all technical ideas within the equivalent range should be interpreted as being included in the scope of the present disclosure.

What is claimed is:

1. A lane keeping control apparatus comprising:
a storage configured to store data and algorithms for a processor; and
the processor configured to:
calculate a target curvature depending on a target path of a vehicle,
calculate a first lateral control value based on a feedforward control by using the target curvature,
calculate a second lateral control value based on a feedback control by using vehicle information collected from a sensing device of the vehicle,
estimate a disturbance by using the vehicle information collected from the sensing device of the vehicle, and
calculate a final lateral control command value by summing the first lateral control value, the second lateral control value, and the disturbance, and
perform a lateral control of the vehicle based on the final lateral control command value,
wherein the processor, after controlling the vehicle with the final lateral control command value, is further configured to:
calculate a rotational curvature of the vehicle by using the vehicle information collected from the sensing device of the vehicle, and
subtract the rotational curvature of the vehicle from the target curvature.

2. The lane keeping control apparatus of claim 1, wherein the processor is configured to calculate the first lateral control value in consideration of a time delay of a steering system of the vehicle.

3. The lane keeping control apparatus of claim 2, wherein the processor is configured to calculate the first lateral control value in consideration of the time delay through a time delay model.

4. The lane keeping control apparatus of claim 3, wherein the processor is configured to design the time delay model by using at least one of a wheel base of the vehicle, a vehicle speed, a time constant, a gear ratio of a front-wheel steering angle to a steering-wheel steering angle, the steering-wheel steering angle, or a combination thereof.

5. The lane keeping control apparatus of claim 2, wherein the processor is configured to calculate the first lateral control value by compensating for the time delay through a differential controller in a Laplace transform process.

6. The lane keeping control apparatus of claim 1, wherein the processor, after controlling the vehicle with the final lateral control command value, is configured to:
input the vehicle information collected from the sensing device of the vehicle into an inverse function that inverses a time delay model, and
obtain the disturbance by subtracting an output value of the inverse function and the final lateral control command value therefrom.

7. The lane keeping control apparatus of claim 6, wherein the processor is configured to filter the disturbance through a low-pass filter.

8. The lane keeping control apparatus of claim 7, wherein the processor is configured to sum the filtered disturbance with the first lateral control value and the second lateral control value to output it as the final lateral control command value.

9. The lane keeping control apparatus of claim 1, wherein the processor is configured to multiply a value obtained by subtracting the rotational curvature of the vehicle from the target curvature by a feedback gain.

10. The lane keeping control apparatus of claim 1, wherein the processor is configured to calculate the second lateral control value by multiplying a value obtained by subtracting the rotational curvature of the vehicle from the target curvature by a reciprocal of a gear ratio of a front-wheel steering angle to a steering-wheel steering angle.

11. A method for keeping lane control, the method comprising:
calculating, by a processor, a target curvature depending on a target path of a vehicle, and calculating a first lateral control value based on a feedforward control by using the target curvature;
calculating, by the processor, a second lateral control value based on feedback control by using vehicle information collected from a sensing device of the vehicle;
estimating, by the processor, a disturbance by using the vehicle information collected from the sensing device of the vehicle;
calculating, by the processor, a final lateral control command value by summing the first lateral control value, the second lateral control value, and the disturbance; and
performing, by the processor, a lateral control of the vehicle based on the final lateral control command value,
wherein calculating the second lateral control value comprises, after controlling the vehicle with the final lateral control command value:
calculating, by the processor, a rotational curvature of the vehicle by using the vehicle information collected from the sensing device of the vehicle, and
subtracting, by the processor, the rotational curvature of the vehicle from the target curvature.

12. The method of claim 11, wherein calculating the first lateral control value comprises calculating, by the processor, the first lateral control value in consideration of a time delay of a steering system of the vehicle.

13. The method of claim 11, wherein calculating the first lateral control value comprises:

calculating, by the processor, the first lateral control value in consideration of a time delay through a time delay model; and designing, by the processor, the time delay model by using at least one of a wheel base of the vehicle, a vehicle speed, a time constant, a gear ratio of a front-wheel steering angle to a steering-wheel steering angle, the steering-wheel steering angle, or any combination thereof.

14. The method of claim 11, wherein estimating the disturbance comprises after controlling the vehicle with the final lateral control command value;

inputting, by the processor, the vehicle information collected from the sensing device of the vehicle into an inverse function that inverses a time delay model; and obtaining, by the processor, the disturbance by subtracting an output value of the inverse function and the final lateral control command value therefrom.

15. The method of claim 14, wherein estimating the disturbance further includes filtering, by the processor, the disturbance through a low pass filter.

16. The method of claim 11, wherein calculating the second lateral control value comprises multiplying, by the processor, a value obtained by subtracting the rotational curvature of the vehicle from the target curvature by a feedback gain; and calculating, by the processor, the second lateral control value by multiplying a value by a reciprocal of a gear ratio of a front-wheel steering angle to a steering-wheel steering angle.

17. A lane keeping control apparatus comprising:

a storage configured to store data and algorithms for a processor; and the processor configured to:
  calculate a target curvature depending on a target path of a vehicle,
  calculate a first lateral control value based on a feed-forward control by using the target curvature,
  calculate a second lateral control value based on a feedback control by using vehicle information collected from a sensing device of the vehicle,
  estimate a disturbance by using the vehicle information collected from the sensing device of the vehicle,
  calculate a final lateral control command value by summing the first lateral control value, the second lateral control value, and the disturbance, and
  perform a lateral control of the vehicle based on the final lateral control command value, wherein the processor, after controlling the vehicle with the final lateral control command value, is configured to:
  input the vehicle information collected from the sensing device of the vehicle into an inverse function that inverses a time delay model, and
  obtain the disturbance by subtracting an output value of the inverse function and the final lateral control command value therefrom.

18. The lane keeping control apparatus of claim 17, wherein the processor is configured to filter the disturbance through a low-pass filter.

19. The lane keeping control apparatus of claim 18, wherein the processor is configured to sum the filtered disturbance with the first lateral control value and the second lateral control value to output it as the final lateral control command value.

* * * * *